US012725098B2

(12) United States Patent
Dietl et al.

(10) Patent No.: US 12,725,098 B2
(45) Date of Patent: Sep. 1, 2026

(54) SYSTEM FOR OPTIMIZED LINE NETWORK USE IN LOCAL PUBLIC TRANSPORT AND METHOD THEREFOR

(71) Applicant: Norbert Dietl, Regensburg (DE)

(72) Inventors: Christoph Dietl, Regensburg (DE); Markus Dietl, Munich (DE)

(73) Assignee: Norbert Dietl, Regensburg (DE)

( * ) Notice: Subject to any disclaimer, the term of this patent is extended or adjusted under 35 U.S.C. 154(b) by 528 days.

(21) Appl. No.: 17/812,462

(22) Filed: Jul. 14, 2022

(65) Prior Publication Data

US 2022/0351095 A1 Nov. 3, 2022

Related U.S. Application Data

(63) Continuation of application No. PCT/IB2021/050206, filed on Jan. 13, 2021.

(30) Foreign Application Priority Data

Jan. 14, 2020 (DE) ..................... 10 2020 100 643.8

(51) Int. Cl.
*G06Q 10/047* (2023.01)
*G06Q 10/02* (2012.01)
(Continued)

(52) U.S. Cl.
CPC ........... *G06Q 10/047* (2013.01); *G06Q 10/02* (2013.01); *G06Q 10/0631* (2013.01); *G06Q 50/40* (2024.01); *G08G 1/123* (2013.01)

(58) Field of Classification Search
CPC .. G06Q 10/047; G06Q 10/02; G06Q 10/0631; G06Q 50/40; G06Q 10/08; G08G 1/123
(Continued)

(56) References Cited

U.S. PATENT DOCUMENTS

2005/0087424 A1* 4/2005 Newsome ................. G07F 9/06 194/320
2005/0258980 A1* 11/2005 Conover ................ G08G 1/133 340/539.1

(Continued)

FOREIGN PATENT DOCUMENTS

DE 19839525 C1 4/2000
DE 202013012418 U1 10/2016

(Continued)

OTHER PUBLICATIONS

Block, Alex; “City Block: Improving passenger information in WMATA’s 7000 series railcars” (<http://web.archive.org/web/20190727131835/https://www.alexblock.net/blog/2016/02/17/improving-passenger-information-in-wmatas-7000-series-railcars/> captured on Jul. 27, 2019 using Wayback Machine). (Year: 2019).*

(Continued)

*Primary Examiner* — Michael P Harrington
*Assistant Examiner* — Brian A Tallman
(74) *Attorney, Agent, or Firm* — Simpson & Simpson, PLLC

(57) ABSTRACT

A system for line network use in local public transport with several transport vehicles is disclosed, which are moving on several lines of a line network. Furthermore, a method for optimizing the use of a line network in local public transport is disclosed for this purpose. The line network is made up of a plurality of nodes and thus a plurality of travel sections and, in addition to the plurality of nodes, comprises a plurality of stops which may be located between two successive nodes. A central control and monitoring software of a computing unit located in an operations control center is communicatively and bidirectionally connected at least to a network client and a ticket client. The available transport vehicles in the line network are essentially dispatched and (Continued)

coordinated by the computing unit in the operations control center on the route sections in accordance with the digitally recorded travel orders.

12 Claims, 9 Drawing Sheets

(51) Int. Cl.
*G06Q 10/0631* (2023.01)
*G06Q 50/40* (2024.01)
*G08G 1/123* (2006.01)

(58) Field of Classification Search
USPC .......................................................... 705/5
See application file for complete search history.

(56) References Cited

U.S. PATENT DOCUMENTS

2008/0068221 A1* 3/2008 Park ..................... H04H 20/55 340/994
2013/0226446 A1 8/2013 Nonner
2013/0238167 A1* 9/2013 Stanfield ................. G08G 1/20 701/2
2014/0049409 A1* 2/2014 Chen ..................... G08G 1/005 340/995.18
2015/0254720 A1* 9/2015 Newberg ........... G06Q 30/0267 705/14.63
2015/0294430 A1* 10/2015 Huang .................... G08G 1/22 701/2
2017/0085632 A1 3/2017 Cardote
2018/0283883 A1* 10/2018 Iland ...................... H04W 4/02
2019/0228655 A1* 7/2019 Väre ...................... G08G 1/133
2021/0268881 A1* 9/2021 Kobel ................... B60J 5/0497

FOREIGN PATENT DOCUMENTS

DE 102017212334 A1 2/2018
DE 102016218113 A1 3/2018
DE 102018106364 A1 9/2018
KR 20160084338 A 7/2016

OTHER PUBLICATIONS

Dziekan, Katrin, and Karl Kottenhoff. “Dynamic at-stop real-time information displays for public transport: effects on customers.” Transportation Research Part A: Policy and Practice 41.6 (2007): 489-501. (Year: 2007).*

Dr. Niels Van Oort and Dr. Oded Cats, Improving public transport decision making, planning and operations by using Big Data, 2015 IEEE 18th International Conference on Intelligent Transportation Systems, pp. 19-24.

P Huber, Advanced Public Transport Information in Munich, Public Transport Electronic Systems, May 21-22, 1996, Conference Publication No. 425, © IEE, 1996, pp. 69-71.

Magdum Nikhil et al: “A Low Cost M2M Architecture for Intelligent Public Transit An Approach to Modernise City Public Transport for Developing Countries”, 2015, XP093251158, Getunden im Internet: URL:https://ieeexplore.ieee.org/stampPDF/getPDF.jsp? tp= &arn umber= 7087035&ret =aH R0CH M6Ly9z Y2hvbG FyLmdvb2dsZS5jb20v.

* cited by examiner

SYSTEM FOR OPTIMIZED LINE NETWORK USE IN LOCAL PUBLIC TRANSPORT AND METHOD THEREFOR

CROSS-REFERENCE TO RELATED APPLICATIONS

The present application is filed under 35 U.S.C. §§ 111(a) and 365(c) as a continuation of International Patent Application No. PCT/IB2021/050,206, filed on Jan. 13, 2021, which application claims priority from German Patent Application No. DE 10 2020 100 643.8, filed on Jan. 14, 2020, which applications are incorporated herein by reference in their entireties.

FIELD OF THE INVENTION

The invention relates to a system for line network use of a plurality of transport vehicles in a line network of local public transport. The system for line network use in local public transport comprises the line network defining a plurality of lines with a plurality of nodes. At least two lines meet at nodes. Each of the at least two lines has a starting stop or a terminal stop, each of which can also define a node. A plurality of transport vehicles travel on a plurality of lines of the line network.

Furthermore, the invention relates to a method for optimizing the line network use of several transport vehicles in a line network of local public transport.

BACKGROUND OF THE INVENTION

German patent DE 198 39 525 C1 discloses a mobility service system, in particular for metropolitan areas. The mobility service system comprises a plurality of mobility services and a dispatch center (central disposition office), wherein the dispatch center calculates a trip route for the mobility services and transmits a current traffic situation, P & R places and/or public transport departure times to the motor vehicle by means of communication devices. A provider of transportation capacity transmits offer parameters for a trip between a starting point and a destination point to the dispatch center. A customer requests a transport capacity from the dispatch center by specifying request parameters for a particular trip. The dispatching center prepares a mobility offer list for the customer by comparing the offer parameters and/or the public transport timetables with the request parameters and transmits it to the customer. The customer can book via the dispatching center.

Korean patent application KR 20160084338 A relates to an intelligent public transportation system and an operating method therefor. The number of passengers on board can be determined via user terminals when the user(s) ride the public transportation system. In advance, the user can express the intention to disembark without pressing a bell to disembark. The intelligent public transportation system comprises: a user terminal that includes payment means information to enable the public transportation user(s) to pay the user fees and transmit the payment means information using a short-range wireless communication method. A public transportation terminal installed in the public transportation means adds payment fee information to the payment means information received from the user terminal to send a payment authorization request, receives and displays payment authorization information relating to the payment authorization request, and transmits counter information relating to passengers boarding and alighting from public transportation. Further provided is a management server that generates the payment authorization information relating to the payment authorization request to transmit the payment authorization information to the public transportation terminal, and generates available seat information of the public transportation terminal by receiving the counter information to transmit the available seat information to the user via the terminal.

US patent application US 2013/0226446 A1 discloses a method for routing in a network with multiple nodes and connections between nodes. First, a start node and a destination node are set. A waiting time distribution for at least one transport means is assigned for at least one intermediate node between the start node and the destination node for each node. Finally, a list of alternative transport means connecting the intermediate node to a subsequent node is provided depending on the waiting time distribution assigned to the at least one transport means at the intermediate node.

German patent application DE 10 2016 218 113 A1 discloses a method for providing demand-based transport capacities in public passenger transport. In the method, a number of persons waiting for a transport vehicle at the stops of a transport line is determined. To the extent of the available transport capacity to be made, the number of waiting persons is distributed among the transport vehicles and the determined route is traveled by transport vehicles.

US patent application US 2017/0085632 A1 describes systems and methods for traffic management in a network of moving things. The systems and methods use vehicles, vehicle sensors, and/or vehicle-based networks of the Internet of Moving Things for traffic control optimization.

Public transport is based on classic scheduled services with fixed travel times on predefined routes and stops. For road-based transport vehicles, mainly city buses with up to 55 seats and 110 standing places are used. In larger cities, additional rail-based transport vehicles such as subways and commuter trains (trams, cable cars) are used with closely timed and coordinated travel times and optimal transfer stations.

In the case of road-based scheduled regular service, the line network plan (route network plan) is far more opaque, especially for those unfamiliar with the area and occasional drivers. The schematic line network plan requires intensive study in order to get from the starting point to the destination. The selection of suitable routes, with transfer stops and connection times, requires an additional look at the timetables of the routes in question. In addition, it is not uncommon for up to seven or more lines to travel the same route and stop at the same stops.

SUMMARY

An object of the invention is to provide a system for line network use of a plurality of transport vehicles in a line network of local public transport, with which the degree of occupancy and the distribution of passengers among the transport vehicles in use and the travel sections can be controlled in real time. Furthermore, it is intended to shorten the time of transportation for the passengers in the line network.

The object is solved by a system for line network use of a plurality of transport vehicles in a line network of local public transport, which is defined by a computing unit having central control and monitoring software. At least one ticket client is provided, which comprises a plurality of elements for ordering or reserving a ticket. The computing unit being installed in an operations control center, wherein the computing unit of the operations control center calculates the dispatching of the transport vehicles on the lines of the line network and the coordination of the transport vehicles with respect to the travel sections and the passengers in the line network in real time from data from the ticket client and data from the network client. A network client has a computing unit and a plurality of clients which are communicatively, bidirectionally connected to the computing unit for the network client, or which comprises a plurality of computing units, wherein one computing unit is assigned to each client of the network client. The computing unit or the computing units of the network client are communicatively connected bidirectionally directly and/or via a communication device to the computing unit in the operations control center.

A further object of the invention is to provide a method for line network use of a plurality of transport vehicles in a line network of local public transport, by means of which the degree of occupancy and the distribution of passengers among the transport vehicles in use and the travel sections of the transport vehicles can be controlled in real time. Furthermore, the transport time for the passengers in the line network is to be shortened.

The above object is solved by a method for line network use of a plurality of transport vehicles in a line network of local public transport. The line network being subdivided into nodes and at least two lines meeting at the nodes. A travel section being defined between successive nodes, and a starting stop and a terminal stop being part of each line, the method comprising the following steps:

- continuously communicatively, bidirectionally connecting a computing unit at least to a ticket client and a network client, wherein the computing unit is installed with control and monitoring software in an operations control center;
- collecting data by means of a computing unit of the network client from several clients of the network client or by means of one computing unit of each of the clients of the network client and/or transmitting data to the clients of the network client;
  - communicatively and bidirectionally connecting the at least one ticket client to the computing unit in the operations control center, the at least one ticket client comprising a plurality of elements which transfer data about ordered tickets to the computing unit in the operations control center, and the network client comprising a plurality of clients which transfer at least data of the transport vehicles and of the line network to the computing unit in the operations control center;
- assigning data on the structure of the line network to the computing unit of the operations control center;
- continuously calculating the degree of occupancy of the individual transport vehicles in real time and determining the distribution of the individual transport vehicles in the line network by means of the computing unit by means of the control and monitoring software in the operations control center on the basis of the data from the network client and the data from the ticket client, so that the passengers are distributed to the individual lines and the creation of the tickets is controlled accordingly with regard to the travel sections.

The system according to the invention for line network use of a plurality of transport vehicles in a line network of local public transport is characterized by the fact that the plurality of transport vehicles travel on several lines of a line network. The line network comprises a plurality of nodes or junctions (intersections) which identify the individual travel sections (trip segments) in the line network. A line in the line network can be formed from the combination of individual connected travel sections. At least two lines meet at nodes or junctions. Furthermore, a start stop or a terminus stop, which is also a node from which at least one line departs or at least one line arrives, defines a start node or a terminus node of the line network. A computing unit with a central control and monitoring software is installed in an operations control center. The system according to the invention comprises a ticket client, which comprises a plurality of elements for ordering and/or reserving a ticket and is communicatively, bidirectionally connected to the computing unit of the operations control center. Furthermore, a network client is provided, which comprises a computing unit. The network client has a plurality of clients that are communicatively bidirectionally connected to a computing unit for the network client. Likewise, one computing unit may be associated with each client of the network client. The computing unit of the network client or the computing units of the clients of the network client may be communicatively, bidirectionally connected directly and/or via a communication device to the computing unit in the operations control center.

The advantage of the system according to the invention is that, in real time, passengers can be better distributed among the transport vehicles operating in the public transport network, thus increasing passenger transport in the public transport network. This has a positive impact on climate ($CO_2$ emissions) and health (particulate matter, nitrogen oxides, noise). In addition, the temporal optimization of the transport vehicles running in the line network increases the attractiveness of public transport, which at least leads to a relief of individual traffic in the cities.

According to the system of the invention, the computing unit of the operations center calculates the dispatching (disposition) of the transport vehicles on the lines of the line network or the dispatching of the transport vehicles on the individual travel sections between the nodes in real time from data from the ticket client and data from the network client. Likewise, the distribution of passengers on the lines of the line network is calculated in real time. For example, the passengers receive from the system a suggestion in real time how to get from a starting point to a desired end point in the most optimal way (shortest time) using the various available transport vehicles (mass transport vehicle, individual transport vehicle). It is not absolutely necessary that the starting point and the end point are covered by the public transport network.

According to an embodiment of the system according to the invention, the computing unit of the operations control center calculates the coordination of the transport vehicles and at least one individual transport vehicle at stops of the lines of the public transport network from data from the ticket client and data from the network client.

According to another embodiment of the system according to the invention, the computing unit of the operations control center takes into account data on the transport volume in the line network from the past. The data from the past are extrapolated into the future and taken into account in the calculation.

According to an embodiment of the system according to the invention, the computing unit is communicatively, bidirectionally connected to a computing unit of an individual client, which is communicatively, bidirectionally connected to at least one provider for individual trips. The computing unit of the operations control center transmits the required individual trips, the time of the request at the respective stop and the number of passengers for the individual trip to the computing unit for the individual client.

According to an embodiment of the system according to the invention, the clients of the network client comprise at least several transport vehicles with associated displays and means for determining the degree of occupancy (occupancy level) of the transport vehicle. The stops are provided with associated displays. The elements of the ticket client comprise at least ticket vending machines or mobile end devices of passengers provided with a mobile APP.

Communication via the communication device may be realized via WLAN, Bluetooth, mobile radio or the like.

The display in the transport vehicles and the display on the outside of the transport vehicles are configured and may be controlled in such a way that at least the nodes to be approached next can be displayed. The displays can be controlled by the computing unit of the network client in such a way that at least the nodes of the line network to be approached next can be displayed on the displays (in and/or on the transport vehicle).

According to an embodiment of the system according to the invention, where necessary, each stop of the line network should be assigned a display which is configured in such a way that the current position of the transport vehicles in the line network, the arrival time of the transport vehicles at the respective stop, the travel distance of the transport vehicles from the current stop of the lines and the degree of occupancy of the transport vehicles at the respective stops of the line network are displayed in real time by the computing unit of the network client.

The method according to the invention for optimizing the line network use of several transport vehicles in a line network of local public transport is characterized by the fact that an existing line network is divided into nodes, with at least two lines meeting at nodes. Likewise, the lines of the line network each define a starting stop or a terminus stop, respectively, which also define a node from which at least one line departs or at least one line arrives, respectively.

For the method according to the invention, a computing unit with a control and monitoring software is installed in an operations control center. The computing unit is continuously communicatively, bidirectionally connected at least with a ticket client and a network client. By means of a computing unit of the network client, data is collected from a plurality of clients of the network client and/or data is transmitted to the clients of the network client. A ticket client is communicatively and bidirectionally connected to the computing unit in the operations control center. The ticket client comprises a plurality of elements that transfer data about ordered tickets to the computing unit in the operations control center. The network client comprises a plurality of clients that transmit at least data of the transport vehicles and the line network to the computing unit in the operations control center. The computing unit in the operations control center uses the data from the ticket client and the data from the network client to continuously calculate the degree of occupancy of the individual transport vehicles in real time. Likewise, the distribution of the individual transport vehicles in the line network is determined from the data so that the passengers are distributed to the individual lines and the creation of the tickets is controlled accordingly.

According to an embodiment of the method, an individual client is communicatively, bidirectionally connected to the computing unit in the operations control center. The computing unit of the operations control center calculates the individual trips required by passengers on the basis of the data supplied by the ticket client and the network client. The result is provided to a computing unit of the individual client.

According to another embodiment of the method, the clients of the network client comprise at least nodes, stops, transport vehicles and the line network of the local public transport system. Based on the calculation of the computing unit, the current line is displayed at least on the externally mounted displays of the transport vehicles and the displays provided at the stops in the form of a list of nodes of the line network still to be approached. When leaving the node, the display is updated by means of the computing unit of the operations control center so that the remaining nodes still to be approached are displayed. The elements of the ticket client comprise at least a mobile APP installed on a mobile end device, an online portal, a ticket vending machine, and a ticket from the driver of the transport vehicle.

According to the method according to the invention, when the stop of the boarding point is entered and the destination is entered at one of the elements of the ticket client, the computing unit of the operations control center immediately calculates (in real time) the route in the line network or the travel sections forming the route. As a result, at least one of the transport vehicles of the lines is assigned to the passenger.

The destination is entered via a ticket feature, wherein the ticket feature is generated by a barcode, a ticket number or an RFID. The ticket feature may also be generated by an input at a ticket vending machine in the transport vehicle or at the stop. The ticket feature may also be generated by an input directly at the mobile end device. The ticket features are transmitted directly to the control and monitoring software of the computing unit in the operations control center and to the computing unit of the network client.

According to an embodiment of the method, the computing unit of the operations control center can determine which of the determined ticket features are transmitted to the computing unit of the individual client so that the computing unit orders a provider for individual trips to a required stop in the network.

On the display located at the stops or nodes (intersections) equipped with it and on the displays of the transport vehicles, the lines, nodes to be approached and, if applicable, the arrival or departure times can be displayed by means of alpha-numeric characters. Furthermore, the individual lines of the line network can be provided with color coding.

According to the methods according to the invention, the list of nodes in the line network still to be approached is updated on the display of the transport vehicle after leaving the stop via the control and monitoring software of the operations control center in connection with the control and monitoring software in the respective transport vehicle.

The list of nodes in the line network still to be approached is updated on the display after leaving the stop via the control and monitoring software in the respective transport vehicle in conjunction with a real-time capable localization of the transport vehicle or by the driver of the respective transport vehicle via a human-machine interface in conjunction with the control and monitoring software in the respective transport vehicle.

The geographic position can be derived from the naming of the nodes and stops. In principle, any characters or symbols can be used to identify the nodes. It is only important that the passenger is able to identify the geographical location of the node from the sign and that the sign can be displayed compactly and easily recognizable for the passenger on the display (destination display) of the transport vehicle.

The transport vehicles show the course of their route in the display on the front side as a list of the nodes still to be approached. Immediately after leaving a node, the list of nodes to be approached is updated in the display via the computing unit of the network client.

It is not mandatory, but desirable that the computing unit of the network client or the computing units for example of the respective ticket client are continuously connected to the computing unit of the operations control center, for example in order to be able to update the display accordingly to the stop or the node for each stop approached. If there is no connection to the computing unit of the operations control center, the control and monitoring software of the computing unit of the network client in the transport vehicle itself would update the destination display after each stop. The destination can be displayed either by the driver of the transport vehicle or automatically by the network client's computing unit by determining the GPS position in the transport vehicle. However, if there is no real-time connection between the transport vehicle and the computing unit of the operations control center, the automatic synchronization of the departure times of the transport vehicles at the nodes of the line network would be omitted. In this case, it is still possible for the drivers of the transport vehicles to communicate via radiotelephony after being requested to do so by the network client's computing unit.

The exchange of information about the destinations of the passengers in the transport vehicle can be done, for example, by input on a touch display. This can be done in the transport vehicle at the latest. Alternatively, an APP-based application on the passenger's mobile end device can be used to pass on the destination information to the control and monitoring software of the transport vehicle. If a real-time connection of the computing unit of the network client to the computing unit of the operations control center is available, the electronically recorded destinations of the passengers can be evaluated in order to synchronize the corresponding transport vehicles of the connecting lines for the transfer (change) at the nodes of the line network. This may be done within the permissible tolerances of the planned travel times.

If destinations are located on routes with extremely low frequency—for example only in the morning, at noon and in the evening—then it is possible to forward the transport demand to approved providers for individual trips for occasional transport.

It is not mandatory to be able to record the degree of occupancy of transportation vehicles after each stop. However, providing this information is more likely to ensure better utilization of transportation vehicles on the same route segments.

At the nodes (intersections) of the line network, displays for passenger information must be available, in particular to ensure intuitive transfer (change) to connecting lines for passengers.

At the stops between two nodes, a display for passenger information is not mandatory. Here, the existing static or fixed information of the lines is sufficient. The additional static or fixed indication of the next node (junction) with the number of stops until it is reached would be advantageous for orientation for passengers who are unfamiliar with the location and for occasional drivers.

A pictorial display of the individual stops on the passenger information displays in the transport vehicle, with the position of the transport vehicle being represented therein in real time, is helpful for passengers who are unfamiliar with the location and for occasional drivers in order to identify and reach the connecting line in good time. Alternatively, the passenger can be guided via an APP-based application on his/her mobile end device during the transfer (change) process or the communication of his travel segments in the line network in order to reach his/her desired destination.

It is obvious for a person skilled in the art that transportation vehicles are not exclusively limited to buses. Cabs, shared cabs, individual vehicles, or autonomously driving vehicles, etc., can also be integrated into the public transport line network, enabling, for example, the time-optimized transport of passengers to low-frequency or non-frequented destinations. These transport vehicles may also be equipped with the displays described. Likewise, it is conceivable that transport vehicles are also provided by the system, which are suitable for transporting bulky objects, for example.

Furthermore, according to the invention, a plurality of smaller transport vehicles may also be used instead of the large, usual transport vehicles (city buses). This has the advantage that the frequency of the transport vehicles in the line network can be increased. Furthermore, the utilization of the transport vehicles is improved and the attractiveness of the public transport is increased.

Definitions

Data from the Past:

Past data concern, for example, data on past major events, data on past weather or traffic situations, data on public transit needs on holidays or during school vacations, data on seasonal public transit needs.

Disposition:

Disposition or dispatching in the sense of the invention means that a computerized system (computing unit of the operations center) provides the basis for decisions on which transport vehicles and how many transport vehicles are to be used in the public transport network. When dispatching the transport vehicles, decisions are made on the basis of the currently known static timetables, the travel orders digitally recorded via the ticket clients, the historical empirical values (data from the past), the current traffic situation, the current weather situation, or information about major events that attract large audiences.

Travel Section:

The line network is divided into individual travel sections (route segments, trip segments) by means of nodes. A line in the line network is made up of travel sections that are connected via common nodes. Each node in the line network serves as a transfer point (change point) in the line network. A line departs from its assigned starting stop and arrives at its assigned terminal stop (end stop). It is not mandatory that the lines travel to the nodes assigned to it. The route of the corresponding lines can be composed as needed from the arbitrary individual travel sections between the nodes. The only condition is that the individual lines depart from their assigned starting stops and arrive at their assigned end stops.

Stop (Station):

Additional stops (stations) of the transport vehicles may be provided between the nodes or the interchanges. The beginning of a line is defined by a starting stop and the end of a line is defined by a terminal stop. The nodes themselves are also stops in the sense of the invention.

Temporary Stop:

The computing unit of the operations control center (electronic system) detects the destination via the elements of the ticket client provided for this purpose and enables the transport vehicle to stop flexibly along the calculated route at a point closest to the passenger's desired final destination. The electronic system then decides on a flexible stop (station) if the closest regular stop (station) along the route to the passenger's final destination would be further away than the distance determined by the computing unit of the operations control center.

Nodes:

Nodes are interchanges (transfer points) where more than one public transit line meets. The nodes divide the line network into travel sections to be traveled by the transport vehicles. The nodes themselves are, of course, also stops (stations). The nodes are synchronization points where the arrival and departure times of the transport vehicles (of various types) are coordinated.

Coordination:

The term coordination, in its general meaning, comprises coordination with each other. In the field of the present invention, coordination means the mutual assignment of transport vehicles of local public transportation and also individual transport vehicles to passengers of public post-transportation. In this case, the coordination is performed in real time on the basis of the data from at least the ticket client and the network client, which are processed in the computing unit of the operations control center.

Transport Vehicle:

Transport vehicles may comprise different transport capacities and types of construction. In addition to transportation vehicles of local public transport, transportation vehicles may be provided by different providers for individual transportation of passengers in the line network and beyond on any day and at any time. Autonomous driving vehicles, electric bicycles, or e-scooters may also be provided as transportation vehicles by providers for individual transportation.

BRIEF DESCRIPTION OF THE DRAWINGS

With reference to the accompanying drawings, the invention and its advantages will now be explained in more detail by means of embodiments, without thereby limiting the invention to the embodiment example shown. The proportions in the figures do not always correspond to the real proportions, since some shapes are simplified and other shapes are shown enlarged in relation to other elements for better illustration.

These and other objects, features, and advantages of the present disclosure will become readily apparent upon a review of the following detailed description of the disclosure, in view of the drawings and appended claims.

Various embodiments are disclosed, by way of example only, with reference to the accompanying schematic drawings in which corresponding reference symbols indicate corresponding parts, in which:

FIG. 1 shows a schematic representation of an embodiment of the system for demand-oriented mobility in local public transport according to the invention.

FIG. 2 shows a schematic representation of a further embodiment of the system according to the invention for demand-oriented mobility in local public transport.

FIG. 3 shows a schematic representation of the system according to the invention for real-time communication in local public transport.

FIG. 4 shows a schematic representation of the change in the display of the destination display on the transport vehicle during travel along a line of the respective transport vehicle.

FIG. 5 shows an exemplary representation of a line network in local public transport with a plurality of nodes and stops.

FIG. 6 shows an exemplary representation of the destination displays of the transport vehicles per node according to the line network shown in FIG. 2.

FIG. 7 shows a passenger information display at stop D or node D of lines T.1-T.3.

FIG. 8 shows a passenger information display at stop DG3 of lines T.1-T.3.

FIG. 9 shows an exemplary matrix representation of a public transport network with a plurality of nodes.

FIG. 10 shows a representation of the data flows for information processing for the passenger when using the system according to the invention.

FIG. 11 shows a hierarchy of the components of the control and monitoring software of the client in the transport vehicle.

DETAILED DESCRIPTION

Identical reference signs are used for elements of the invention that are identical or have the same effect. Furthermore, for the sake of clarity, only reference signs necessary for the description of the respective figure are shown in the individual figures. The figures merely illustrate examples of embodiments of the invention without, however, limiting the invention to the illustrated examples of embodiments.

Furthermore, it is understood that this disclosure is not limited to the particular systems, methods, methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

Moreover, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
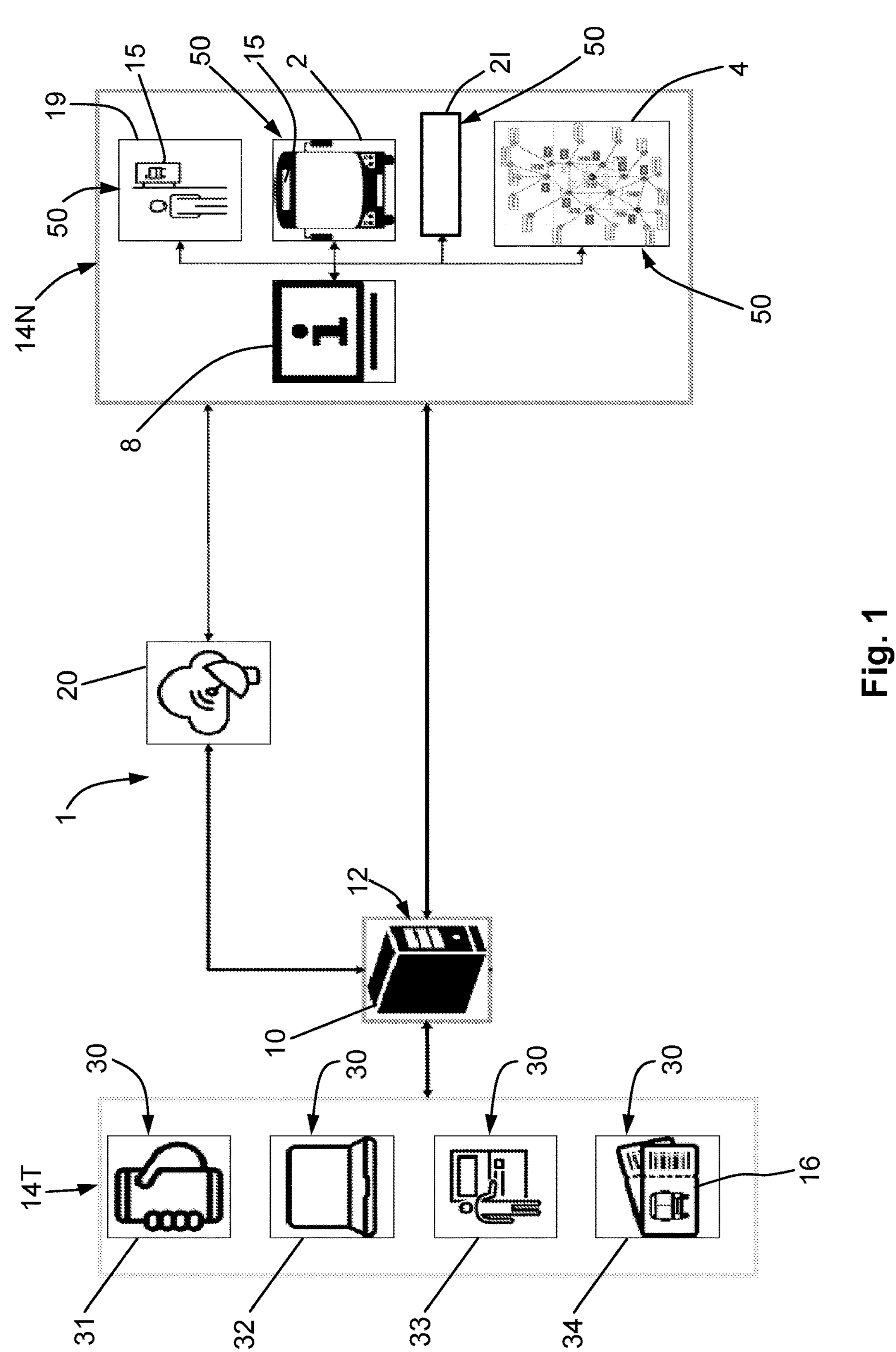

Adverting now to the figures, FIG. 1 shows a schematic representation of an embodiment of the system 1 according to the invention for demand-oriented mobility in local public transport. System 1 for line network use in local public transport comprises at least one ticket client 14T, a computing unit 10 installed in an operations control center 12 and a network client 14N.

Ticket client 14T comprises at least one element 30 for creating or booking a ticket or fare 16, for example, to travel from a starting point inside or outside a line network 4 to a destination point inside or outside line network 4. The elements 30 of ticket client 14T may be, for example, a mobile APP 31, an online portal 32, a ticket vending machine 33 (in a bus, at a stop 19 or at a place (not shown) with a plurality of passengers). The different elements 30 described in FIG. 1 should not be understood as a limitation of the invention. Ticket client 14T communicates bidirectionally with computing unit 10, which includes a central control and monitoring software. Computing unit 10 is installed in an operations control center 12. Recorded data of purchased or ordered tickets 16 or transport orders are transmitted to the computing unit 10 in a conventional manner. The data is used by computing unit 10 to determine the distribution of passengers on individual lines T1, T2, . . . , TJ or travel sections 7 of lines T1, T2, . . . , TJ of line network 4 and transport vehicles 2 used there.

For simplicity, the following description is limited to a computing unit 8 of network client 14N which is communicatively and bidirectionally connected to clients 50 of network client 14N. This is not to be construed as a limitation of the invention. Likewise, each client 50 of network client 14N may be associated with its own computing unit 8, which is communicatively and bidirectionally connected to computing unit 10 of an operations control center 12. Network client 14N comprises at least one client 50. The clients 50 of network client 14N may be, for example, a stop 19 with a display 15, a plurality of transport vehicles 2 each with a display 15, an individual transport vehicle 2I or the line network 4. The different clients 50 described in FIG. 1 should not be construed as limiting the invention. Network client 14N also includes a computing unit 8 that is communicatively and bidirectionally connected to the plurality of clients 50. Further, computing unit 8 of network client 14N is communicatively and bidirectionally connected to computing unit 10 in operations control center 12. The communicative and bidirectional connection of the computing unit 8 of network client 14N with the computing unit 10 in operation control center 12 may be direct and/or via a communication device 20. By means of the communication link 20, computing unit 10 in operations control center 12 can be connected to the computer-based operations control system for Intermodal Transport Control System (ITCS) present in computing unit 8 of network client 14N, which is a computer backbone system used in public transport (ÖPNV) that can be used for a variety of tasks. Other terms for the software in computing unit 8 of network client 14N are known as CAD/AVL (Computer Aided Dispatch/Automatic Vehicle Location) or AVLS (Automatic Vehicle Location System).

Computing unit 8 of network client 14N controls, for example, the information on the displays 15 at the stops 19 and the displays 15 on or in the transport vehicles 2. Likewise, computing unit 8 of network client 14N has information about the status of line network 4 and the availability of individual transport vehicles 2I. The position of the transport vehicles 2 and 2I in line network 4 can be determined, for example, by means of GPS. The displays 15 (stops 19, transport vehicles 2 or mobile devices) are updated by computing unit 8 based on the GPS data. If, for example, a ticket 16 is ordered or purchased in ticket client 14T, computing unit 10 calculates the optimal route (travel sections 7 in line network 4) and the distribution of the corresponding passenger to the lines T1, T2, . . . , TJ of line network 4. The data of computing unit 8 of network client 14N are also used for this purpose.

Figure 2:
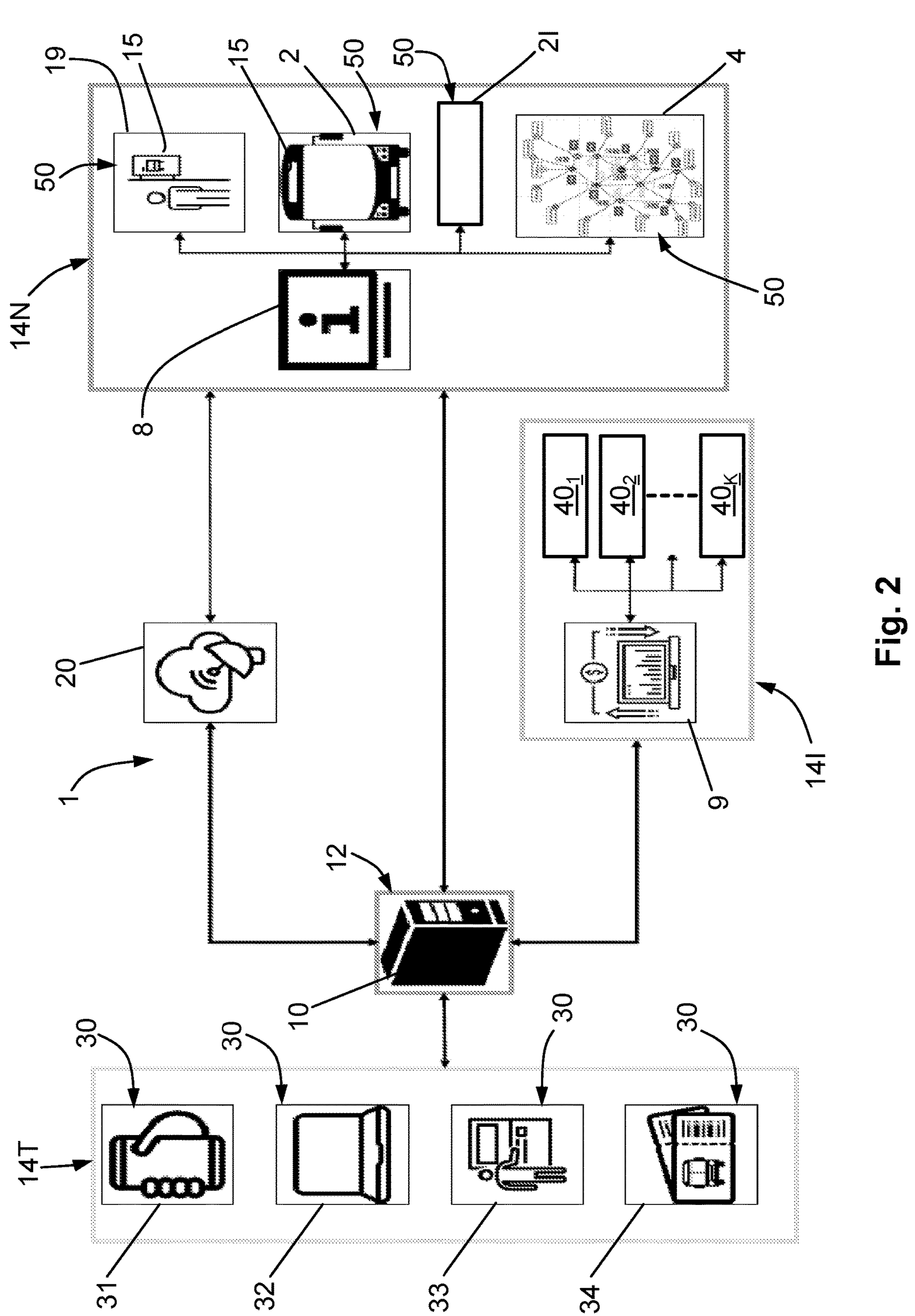

FIG. 2 shows a schematic representation of a further embodiment of system 1 according to the invention for demand-oriented mobility in local passenger transport. In this embodiment, an individual client 14I is communicatively, bidirectionally connected to computing unit 10 of operations control center 12. Individual client 14I has a computing unit 9 that is communicatively and bidirectionally connected to at least one provider $\mathbf{40}_1$, $\mathbf{40}_2$, . . . $\mathbf{40}_K$ for individual trips. Computing unit 10 of operations control center 12 is communicatively and bidirectionally connected to computing unit 9 of individual client 14I. Thus, for example, by means of computing unit 10 of operations control center 12, from the information of the ordered or purchased tickets 16, if necessary, an individual trip can be ordered from a specific stop 19 of line network 4, so that the passenger or passengers can be driven to a destination which is outside line network 4 or which is not departed from within line network 4 in the desired time.

Figure 3:
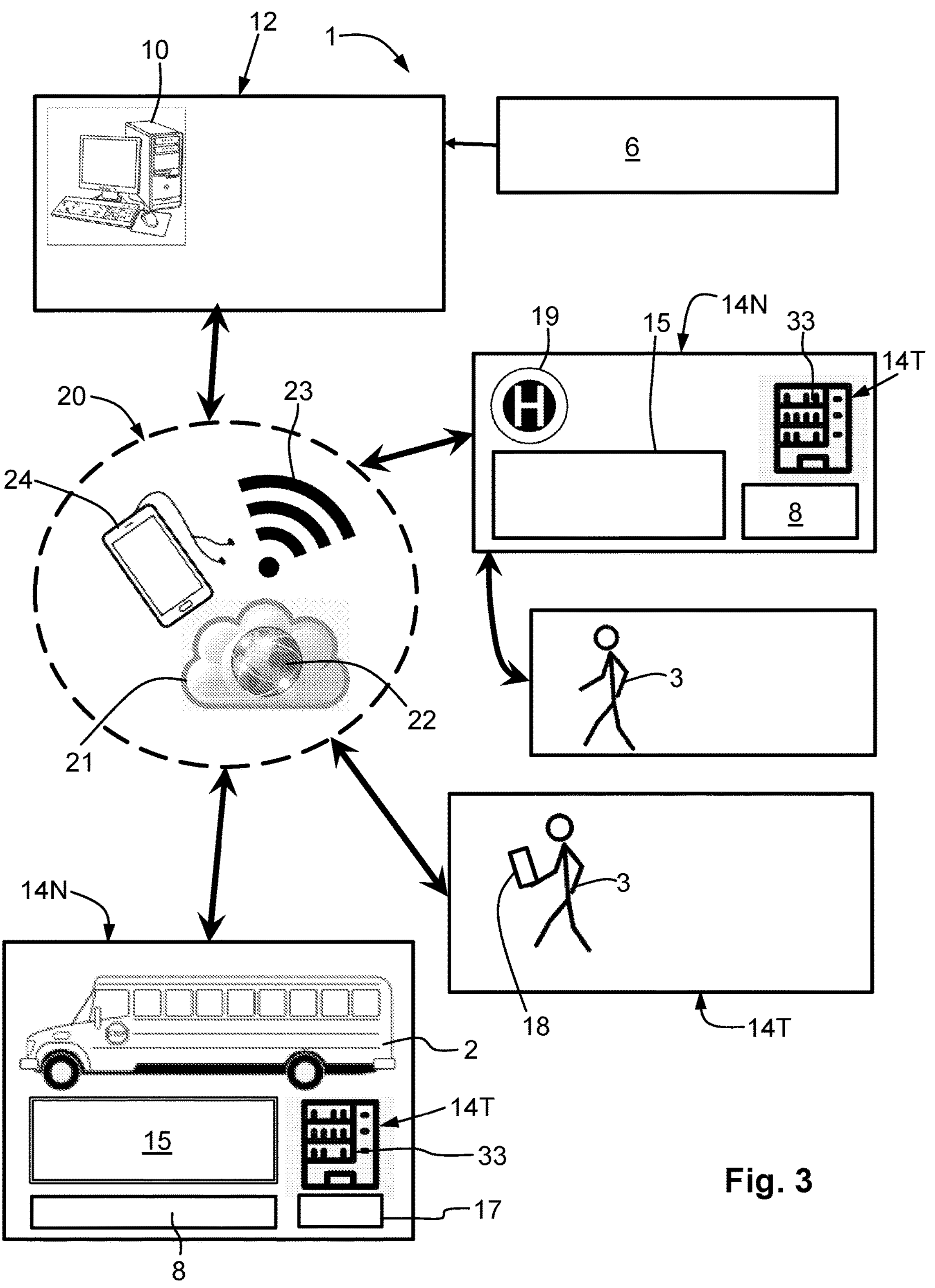

FIG. 3 shows another schematic representation of system 1 according to the invention for real-time communication and data exchange in local public transport. System 1 comprises the computing unit 10 in operations control center 12, which includes a central control and monitoring software. The control and monitoring software can be used to optimize existing network schedules or timetables 6 of the transport vehicles 2 in line network 4 and to adapt them to the transport volume determined by computing unit 10.

In the embodiment shown here, network clients 14N are connected to the control and monitoring software of computing unit 10. Further, at least one ticket client 14T is connected to the control and monitoring software of computing unit 10. The network clients 14N are connected to the central computing unit 10 via the common computing unit 8, as shown here, via the communication device 20. One of the network clients 14N shown here comprises the transport vehicles 2 traveling in the line network 4 (see FIG. 5). The transport vehicle 2 may be equipped, for example, with the associated displays 15 (route and/or destination display inside and outside) and the means 17 for determining the degree of occupancy in transport vehicle 2 (for example, a counter (not shown) of the passengers 3 boarding and alighting). Ticket vending machine 33 located in transport vehicle 2 is associated with ticket client 14T (see FIGS. 1 and 2).

The ticket client 14T shown here, which is connected to central computing unit 10 via communication device 20, represents the mobile end device 18 of passengers 3 of the local public transport system. Mobile end device 18 can be used by the passenger 3 to book tickets for transportation. Passenger 3 can thus be shown, via mobile end device 18, the information about the optimal route calculated for passenger 3. Likewise, passenger 3 can be informed, for example, with regard to a transfer option, for example, acoustically, if he/she has suitable equipment for this purpose.

Another network client 14N is, for example, one of the stops 19 for local public transport. Ticket vending machine 33 that may be present at stop 19 is also to be assigned to ticket client 14T. Likewise, a display 15 is provided at stop 19. The data, such as destinations of passengers 3 without a mobile end device, are recorded at the respective stop 19 or at the latest in transport vehicle 2 and transmitted to central computing unit 10 by means of the computing unit 8 of the ticket client 14T via communication device 20. Communication device 20 can be implemented, for example, by means of WLAN 23, Bluetooth, mobile radio 24, near-field control transmissions, RFID or the like. For this purpose, a cloud 21 can be provided, for example, which as a system architecture enables the communication device 20 at least between the network clients 14N or the ticket clients 14T and the central computing unit 10 in the operations control center 12. For example, Internet 22 is a communication protocol for this purpose.

The control and monitoring software, which is assigned to computing unit 10, runs in a distributed manner on a contemporary server-client hardware infrastructure in order to display to the passengers 3 in real time the route or the travel sections 7 of the transport vehicles 2 in a continuously updated manner for all transport vehicles 2, nodes (junctions) K1, K2, . . . , KN and the stops 19 in the respectively valid line network 4 of the local public transport system. Furthermore, the control and monitoring software displays to the passengers 3 the transfer to other lines or connecting lines of line network 4 from the first boarding to the alighting at the destination both in transport vehicle 2 on display 15 and on mobile end device 18, if present. At the transfer stops, the departure times of the transport vehicles 2 arriving at the nodes K1, K2, . . . , KN are synchronized. All this is achieved by the fact that the control and monitoring software, by means of computing unit 10 of operations control center 12, represents an interconnection between network client 14N and ticket client 14T and is thus continuously connected to all transport vehicles 2 of the displays 15 for passenger information, the displays 15 for passenger information at the stops 19, the ticket vending machines 33 at stops 19, the ticket vending machines 33 with validators in the transport vehicle 2 and the mobile end devices 18 with passenger information of the passengers 3, in order to obtain all the required information and to be able to calculate feedback on the execution of actions, such as, for example, updating the list of nodes K1, K2, . . . , KN to be approached on display 15 of transport vehicles 2.

The displays 15, which are mounted on the outside of the transport vehicles 2, continuously show, updated on the basis of the calculation by computing unit 10 of operations control center 12, the route of nodes K1, K2, . . . , KN in line network 4 that are still to be approached. After each stop at a node K1, K2, . . . , KN, the control and monitoring software of computing unit 10 updates the contents of the display. Display 15 of the destinations of the transport vehicles 2 is directly or indirectly connected to the control and monitoring software of computing unit 10 via network client 14N, in order to be able to influence the output at the destination display in real time. After each stop of a transport vehicle at a node K1, K2, . . . , KN of the line network 4, the list of the remaining nodes K1, K2, . . . , KN still to be approached is updated via control and monitoring software of computing unit 10 or computing unit 8 of network client 14N. If there is an interruption between the control and monitoring software of the computing unit 10 in the operations control center 12 and the network clients 14N, for example, the display 15 of the destinations can also be updated locally by control and monitoring software of computing unit 8 of network clients 14N directly via the control and monitoring software of computing unit 8 of network client 14N. In the case of real-time capable positioning of transport vehicle 2 (for example, by GPS), this can be automated. It is also possible that the driver updates the display 15 via the application part of the control and monitoring software in the transport vehicle 2.

Figure 4:
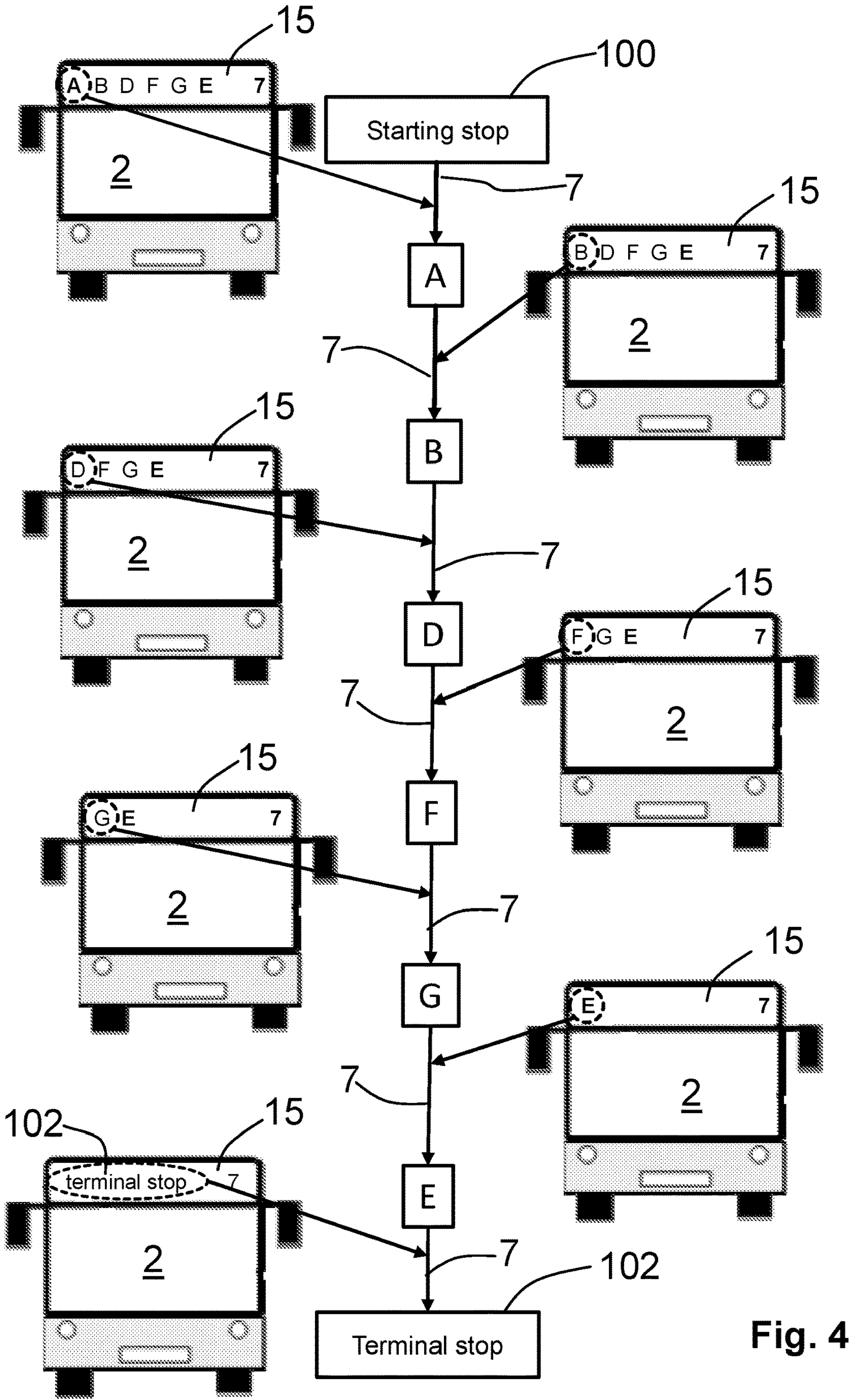

FIG. 4 shows a schematic change of display 15 on the transport vehicle 2 during the journey from starting stop 100 to terminal stop 102. During the journey of a transport vehicle 2 such as for example the line T7, it is not necessary that the transport vehicle 2 approaches the nodes K1, K2, . . . , KK, which are located along the route of transport vehicle 2 of lines T7 defined in network plan 6. Depending on the calculation by computing unit 10 of operation control center 12, any nodes of network plan 6 can be approached. The only condition is that, as described here, line T7 supplies the starting stop 100 and the terminal stop 102. When transport vehicle 2 leaves starting stop 100, the next nodes A, B, D, F, G and E to be approached are indicated on the display 15 of transport vehicle 2. It is obvious that the designation of the nodes made herein is to be understood as a descriptive example and cannot be construed as a limitation of the invention.

If transport vehicle 2 now leaves node A, the next nodes B, D, F, G and E to be approached via the travel sections 7 are displayed on display 15 of transport vehicle 2. If transport vehicle 2 leaves node B, the next nodes D, F, G and E to be approached are displayed on display 15 of transport vehicle 2. If transport vehicle 2 leaves node D, the next nodes F, G and E to be approached are displayed on display 15 of transport vehicle 2. If transport vehicle 2 leaves node F, the next nodes G and E to be approached are displayed on display 15 of transport vehicle 2. If transport vehicle 2 leaves the last node E before the terminal stop 102, the terminal stop 102 is displayed on display 15 of transport vehicle 2 of line T7.

Figure 5:
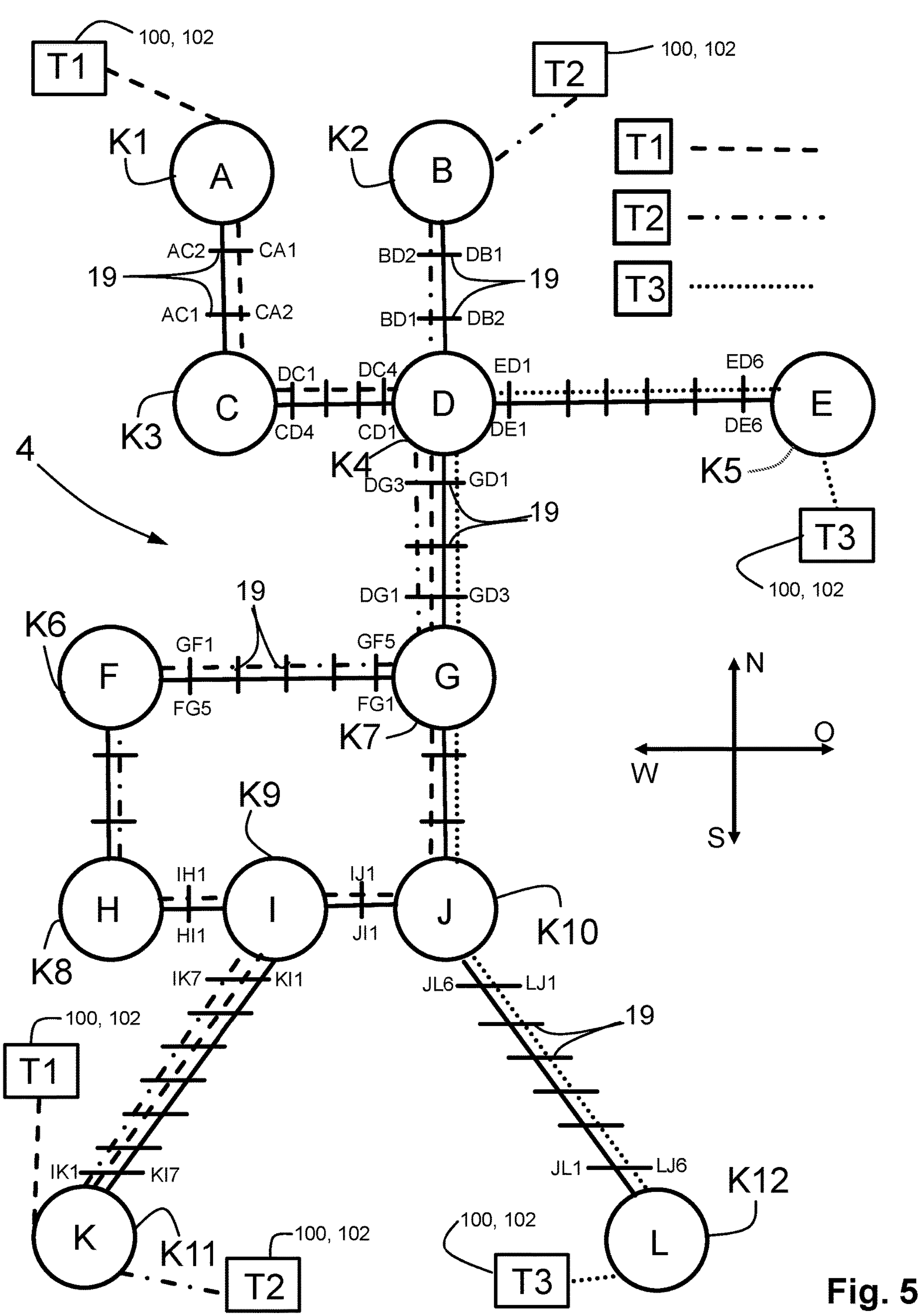

FIG. 5 shows an exemplary representation of a line network 4 in local public transport with a plurality of nodes K1, K2, . . . , KN. A node K1, K2, . . . , KN is defined by the fact that at least two lines T1, T2, . . . , TJ cross at it. In the embodiment of FIG. 5, three lines T1-T3 are provided as an example, which are served by the transport vehicles 2. Line network 4 comprises twelve nodes K1, K2, . . . , K12, wherein the nodes at the beginning or end of one of lines T1-T3 are respectively preceded or followed by a starting stop 100 or a terminal stop 102 of the lines T1-T3 of line network 4. Here, too, it should be pointed out once again that the illustration shown here is merely for the purpose of understanding the invention and cannot be construed as its limitation.

At the nodes at the end of line network 4, at least one line arrives at a terminal stop 102 or departs from a starting stop 100. At the nodes in between, at least two lines meet, wherein the nodes define interchanges (transfer points). Nodes K1, K2, . . . , K12 define stops 19 and between the nodes K1, K2, . . . , K12 further stops 19 are possible. Nodes K1, K2, . . . , K12 identify stops 19 where the lines T1-T3 split, cross, come together or end. These nodes K1, K2, . . . , K12 are shown in the plan of line network 4 and are designated in such a way that the geographical location of the nodes in the plan of line network 4 can be imagined without much local knowledge. Thus, in the present embodiment, node K1 with designation A and node K2 with designation B are located in the north of line network 4, and node K11 with designation K and node K12 with designation L are located in the south of line network 4. Although the description for FIG. 2 is limited to three lines T1-T3 and twelve nodes K1, K2, . . . , K12 for the sake of simplicity, this should not be construed as a limitation of the invention. It is obvious for a person skilled in the art that line networks 4 in local public transport can be equipped as required with regard to the number of lines T1, T2, . . . , TJ and the number of nodes K1, K2, . . . , KN. As an example, the journey of a transport vehicle 2 in line network 4 of FIG. 5 is described. Line T1 departs from starting stop 100 and first arrives at node K1 (denoted by A). From node K1, denoted by A, line T1 departs and, after node K11, denoted by K, terminates at terminal stop 102. On its way from node K1 to node K11, line T1 approaches and stops at the nodes denoted by C, D, G, J and I, also stopping, if necessary, at the respective intermediate stops 19.

Figures 6, 7, 8:
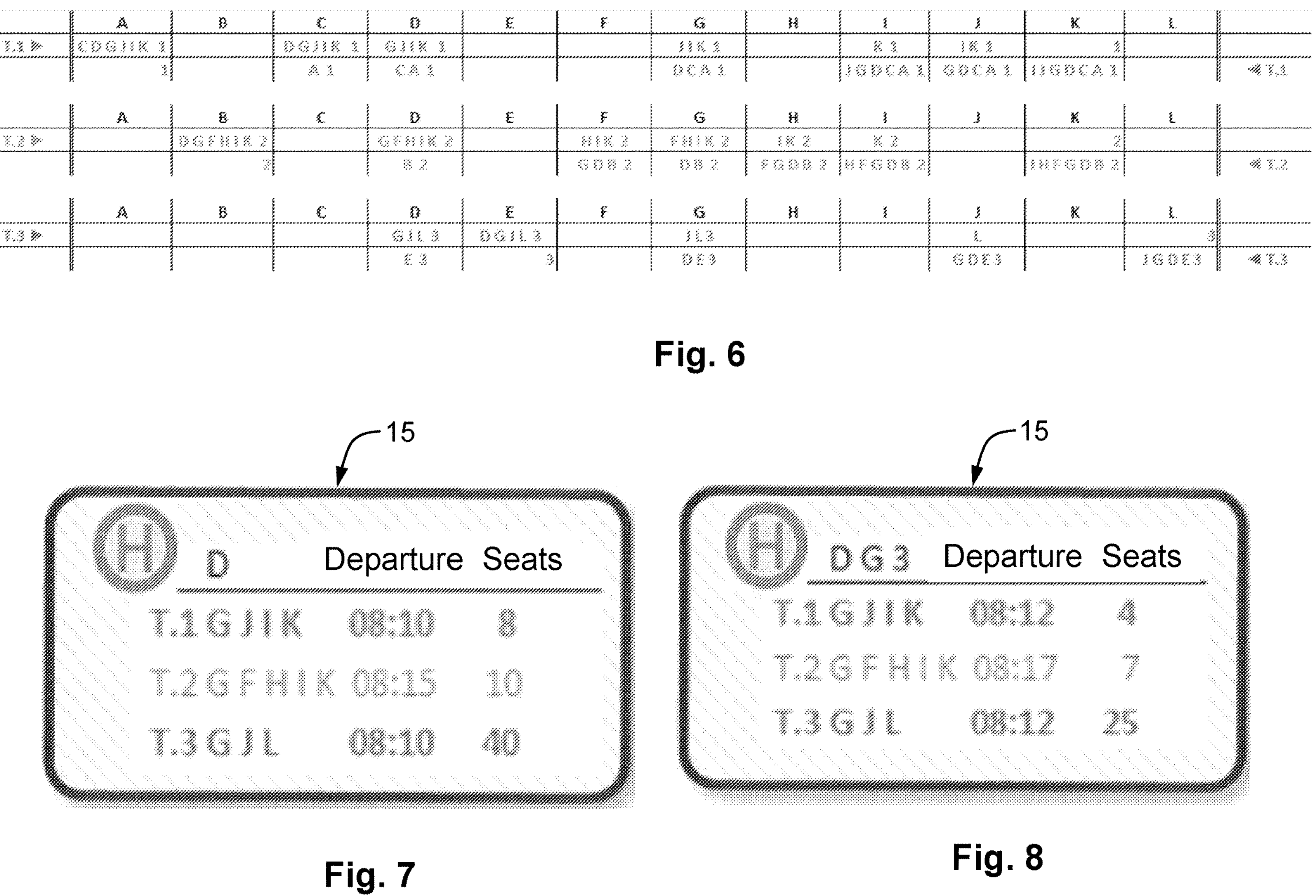

FIG. 6 shows an exemplary representation of the contents of the displays 15 of the destinations of the transport vehicles 2 per node K1, K2, . . . , K12 according to the line network 4 shown in FIG. 5. The contents of display 15 and its changes are also described using the example of line T1. When line T1 departs from starting stop 100 or terminal stop 102, all nodes A, C, D, G, J, I, K to be approached are still displayed. After the departure from node K1 (labeled A), display 15 shows the nodes still to be approached, labeled C, D, G, J, I, K.

Before the departure of line T1 from node K3 (denoted by C), display 15 is automatically changed by computing unit 8 of network client 14N or, if necessary, also manually (locally by transport vehicle 2), if the connection to computing unit 8 is not present. The nodes to be approached with the designation D, G, J, I, K are now still displayed in display 15.

Before the departure of line T1 from node K4 (denoted by D), display 15 is changed automatically or, if necessary, manually. In display 15, the nodes to be approached are now still displayed with the designation G, J, I, K.

Before the departure of line T1 from node K7 (denoted by G), display 15 is changed automatically or, if necessary, manually. In display 15, the nodes to be approached are now still displayed with the designation J, I, K.

Before departure of line T1 from node K10 (denoted by J), display 15 is changed automatically or manually, if necessary. In display 15, the nodes to be approached are now still displayed with the designation I, K.

Before departure of line T1 from node K9 (denoted by I), display 15 is changed automatically or manually, if necessary. The last node to be approached with the designation K is now still displayed in the display 15.

Node K11 (denoted by K) is located before terminal stop 102 of line T1. Before the return trip from terminal stop 102 via node K11 (denoted by K) to node K1 (denoted by A), which is located in front of starting stop 100, the nodes to be approached now with the designation K, I, J, G, D, C, A are displayed on display 15.

Before the departure of line T1 from node K9 (denoted by I), display 15 is changed automatically or, if necessary, manually. In display 15 now still the nodes to be approached with the designation J, G, D, C, A are displayed.

Before departure of line T1 from node K10 (denoted by J), display 15 is changed automatically or manually, if necessary. In display 15, the nodes to be approached are now still displayed with the designation G, D, C, A.

Before the departure of line T1 from node K7 (denoted by G), display 15 is changed automatically or, if necessary, manually. In display 15, the nodes to be approached are now still displayed with the designation D, C, A.

Before departure of line T1 from node K4 (denoted by D), display 15 is changed automatically or manually, if necessary. In display 15, the nodes to be approached are now still displayed with the designation C, A.

Before departure of line T1 from node K3 (denoted by C), display 15 is changed automatically or manually, if necessary. In display 15 now still the node to be approached with the designation A is indicated.

FIG. 7 shows a display 15 for passenger information at a stop 19 (with the designation D or denoted as node K4) of the lines T.1-T.3. Display 15 of FIGS. 7 and 8 shows for the lines T1, T2 and T3 the nodes still to be approached, the departure time of the respective line T1, T2 and T3 and the seats still available in the respective transport vehicle 2 of the respective line T1, T2 and T3.

FIG. 8 shows a display 15 for passenger information at a stop 19 (denoted by DG3) of the lines T.1-T.3. The display 15 of passenger information at stop DG3 of lines T.1-T.3 has been modified with respect to the departure time of the respective line T1, T2 and T3 and the seats still available in the respective transport vehicle 2 of the respective line T1, T2 and T3.

The displays 15 of FIGS. 7 and 8 are updated when the transport vehicle 2 arrives at the respective stop 19.

Figure 9:
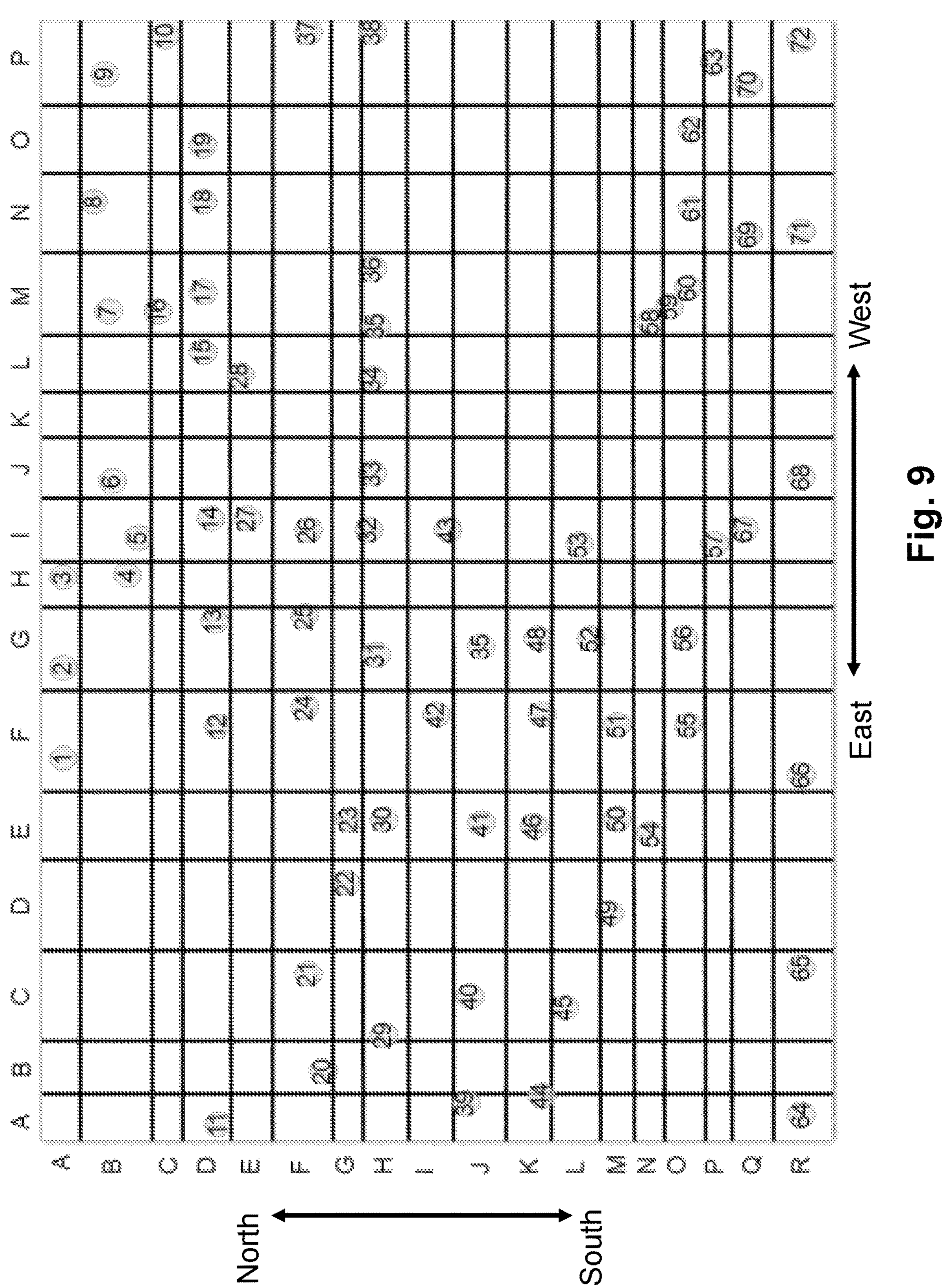

FIG. 9 shows an exemplary matrix representation 5 of a line network 4 in public transport. Here, each of the plurality of nodes K1, K2, . . . , KN is designated by a number. Each of the nodes K1, K2, . . . , KN can be defined in the matrix representation 5 by a coordinate value in the east/west direction and a coordinate value in the north/south direction.

Figure 10:
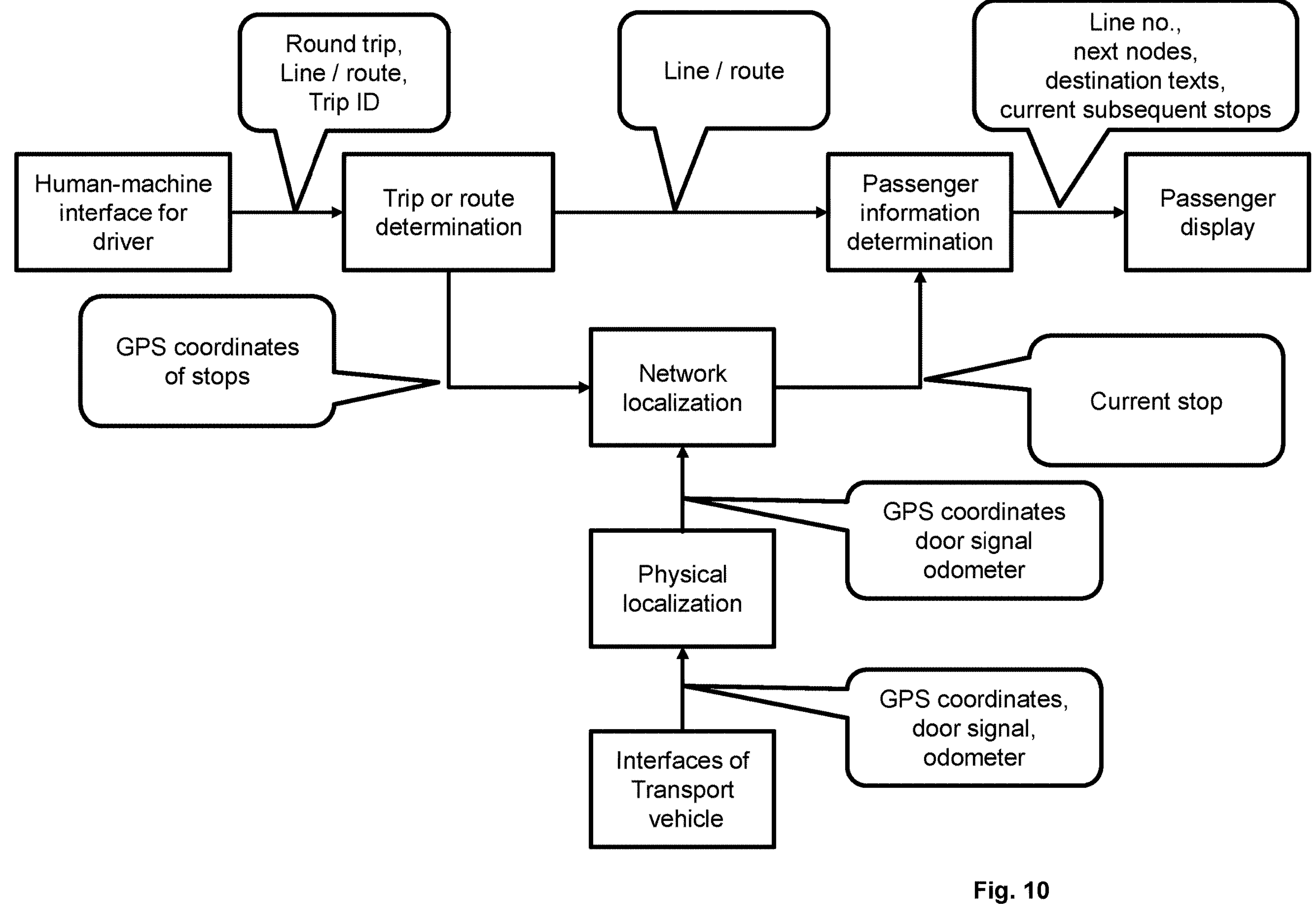

FIG. 10 shows a solution for information processing for the passenger 3 in the system 1 according to the invention. Elements of network client 14N and ticket client 14T (see FIGS. 1 and 2) are responsible for the processing of the information provided to the passengers 3. In the embodiment shown in FIG. 10, for example, the result of determining a destination text for the displays 15 on the outside of the transport vehicles 2 is described. The data flows are performed in the direction of the arrows shown in FIG. 10.

The driver of a transport vehicle 2 enters at least the round trip, the line T1, T2, . . . , TJ and the trip ID via a human-machine interface. Based on this data, a trip or route determination is performed with computing unit 10 of operations control center 12. The data resulting from the trip or route determination, such as stops 19 on the route and their GPS coordinates, are transferred to computing unit 10 of operations control center 12 for localization in line network 4.

The determination of the position of the transport vehicles 2 in line network 4 (physical localization of transport vehicle 2), is initially carried out on the basis of interfaces of the respective transport vehicle 2 via GPS coordinates, the door signals and/or the odometer. From the physical localization (tracking), the GPS coordinates, the door signals and/or the odometer result in the localization in line network 4 (network localization). For the localization in line network 4, the data of the physical localization and the data of the stops 19 (such as their GPS coordinates) on the route are matched by means of the computing unit 10 of operations control center 12.

By means of the localization in line network 4 (network localization), the current position of the respective transport vehicle 2 in line network 4 is now known. The data of the current stop 19 are used for the passenger information determination. For updating the display 15, which is mounted on the outside of transport vehicle 2, the number of line T1, T2, . . . , TJ, the next nodes to be approached and, if display 15 is large enough, the texts for the end node of line T1, T2, . . . , TJ and the subsequent stops 19 are displayed and, if necessary, updated when leaving stop 19.

Figure 11:
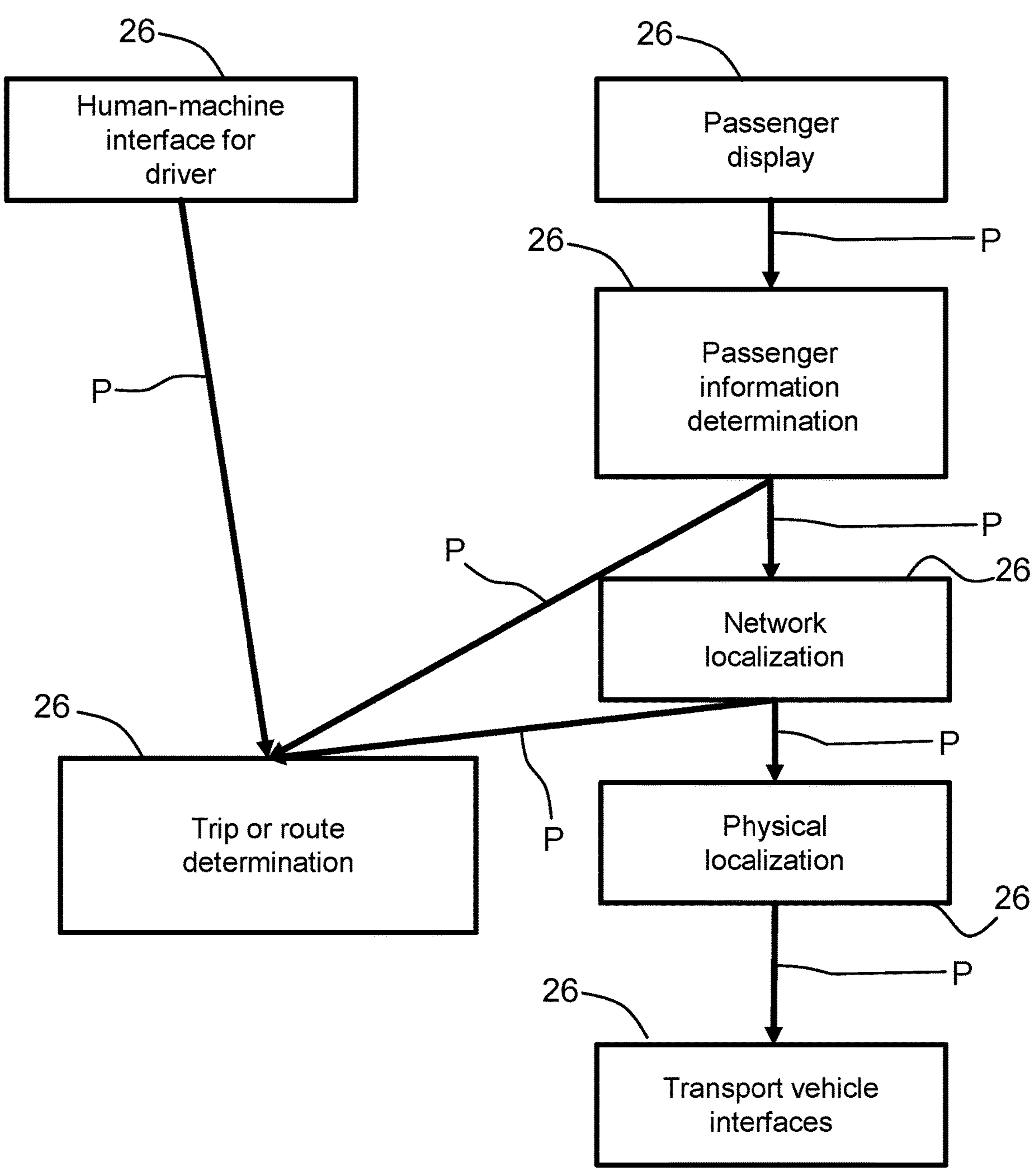

FIG. 11 shows a hierarchization of the components 26 of the control and monitoring software of a client 50 (see FIG. 1 or 2) of the network client 14N of the transport vehicle 2. In the embodiment shown here, it is such that the components 26 of the control and monitoring software shown further down in FIG. 11 provide the data for components 26 further up. The components 26 further up are thus active information users (such as displays 15) that retrieve data from passive information providers (such as the network localization components or the physical interfaces). The components 26 further downstream are generally unaware of the service of a component 26 requesting data. Components 26 further upstream, or devices with components 26 of the control and monitoring software, are aware of the service of a component 26 from which data must be retrieved. The arrows P shown in FIG. 11 are to be understood in the sense that, for example, component 26 "Passenger information determination" uses a function of the service of component 26 "Journey/route determination" provided by this service. Here, this would be the functionality shown in FIG. 10, which determines the route in the line network 4 of a line T1, T2, . . . , TJ.

A display 15 shows current information about the transport vehicles 2 in the line network 4, such as the current position, the arrival time at the stop 19, the route as a list of nodes K1, K2, . . . , KN in line network 4 and the degree of occupancy in real time, by means of the central control and monitoring software of computing unit 10 of operations control center 12, which is in communication with at least the network client 14N and the ticket client 14T. Display 15 can be textual and graphical both in the passenger compartment of the transport vehicle 2, at the stops 19 and on the mobile end device 18 of the passenger 3. The contents of display 15 can be specifically prepared by the central control and monitoring software of computing unit 10. Relevant information on transfer points can be displayed with their connecting lines textually as well as graphically on the driving information display in transport vehicle 2. This can be done, for example, by graphically preparing the information on a map display of respective line network 4 in the public transport area on mobile end device 18 of passenger 3. The relevant information can be transmitted to passenger 3 both visually on the display of mobile end device 18 or via data glasses, acoustically via loudspeaker or headphones and haptically, for example via vibration.

An entry of the destination by passenger 3 is to be made immediately at the start of the trip in order to determine the transfer operations with the central control and monitoring software of computing unit 10 in communication with the control and monitoring software of the respective clients 14N, 14T and 14I. For the assignment of the transport order, a unique ticket characteristic, such as barcode, ticket number or RFID, is used in order to be able to make rebookings or to cancel the trip in connection with the central control and monitoring software of computing unit 10 in communication with the respective clients 50 of the network clients 14N (transport vehicles 2) using the data of ticket vending machines 33 at stop 19, the ticket vending machines 33 in transport vehicle 2 or at the end device 18 of passenger 3.

According to a possible development stage of the system according to the invention, a forwarding (passing on) of the travel order to approved providers for individual trips ($\mathbf{40}_1$, $\mathbf{40}_2$, . . . , $\mathbf{40}_K$) of the individual client 14I can take place in the occasional traffic, if the destinations of lines T1, T2, . . . , TJ cannot be served in the travel time desired by passenger 3 or by the public transport. The central control software of computing unit 10 requests an authorized driving service at the last stop 19 approached by the public transport by automatically transmitting the arrival time, number of persons and final destination to the provider for individual trips ($\mathbf{40}_1$, $\mathbf{40}_2$, . . . , $\mathbf{40}_K$). The passenger 3, who has a mobile end device with the corresponding application for this function, receives a message from the provider for individual trips ($\mathbf{40}_1$, $\mathbf{40}_2$, . . . , $\mathbf{40}_K$) so that the order can be bindingly confirmed.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

1 System
2 Transport vehicle
2I Individual transport vehicle
3 Passenger
4 Line network, route network
5 Matrix representation
6 Timetables, network schedules
7 Travel section, trip segment, route segment
8 Network client computing unit
9 Individual client computing unit
10 Computing unit
12 Operations control center
14I Individual client
14N Network client
14T Ticket client
15 Display
16 Ticket, fare
17 Means
18 Mobile end device
19 Stop, station
20 Communication device
21 Cloud
22 Internet
23 WLAN
24 Mobile radio
26 Component
30 Element
31 Mobile APP
32 Online portal
33 Ticket vending machine
34 Ticket on the bus
$\mathbf{40}_1$, $\mathbf{40}_2$, . . . , $\mathbf{40}_K$ Provider for individual trips
50 Client
100 Starting stop
102 Terminal stop, final stop, end stop, terminal station
K1, K2, . . . , KN Node, junction
P Arrow
T1, T2, . . . , TJ Line

What is claimed is:

1. A system for line network use of a plurality of transport vehicles in a line network of local public transport, which defines several lines, each with a plurality of nodes, a travel section between successive nodes, and a route configured to be composed as needed from arbitrary individual travel sections, wherein at nodes at least two lines meet, each line of the at least two lines has a starting stop and a termination stop from which at least one line originates or at least one line arrives, and each line has at least one intermediate stop and each node is a stop as well, the system comprising:

a first computing unit installed in an operations control center, wherein the first computing unit of the operations control center has central control and monitoring software installed;

at least one first display disposed on an inside or an outside of at least one of the plurality of transport vehicles, the first display configured to be updated by the central control and monitoring software of the first computing unit in real time after a stop at each junction, wherein the at least one first display displays passenger information updated in real time by the central control and monitoring software of the first computing unit by data received from:

a ticket vending machine disposed in the at least one of the plurality of transport vehicles, at least one network client that determines an occupancy level of the at least one of the plurality of transport vehicles, and at least one mobile terminal device of a passenger of the at least one of the plurality of transport vehicles;

at least one second display disposed at least at one junction of the line network, and/or at least at one stop of the line network, the at least one second display configured to display:

a current position of the at least one of the plurality of transport vehicles in the line network, an arrival time of the at least one of the plurality of transport vehicles at a respective stop, and, a route defined by updated nodes; and, a ticket client comprising at least one of a mobile APP, an online portal, or a ticket vending machine, the ticket client configured for ordering or reserving a ticket, the ticket client transmitting recorded data of purchased or ordered tickets to the first computing unit of the operations control center, wherein the ticket client is continuously communicatively, bidirectionally connected with the first computing unit of the operations control center;

wherein, the at least one network client comprises a plurality of clients, the plurality of clients including at least one of a node, a stop, at least one of the plurality of transport vehicles, or the line network of the local public transport system, the at least one network client includes a second computing unit communicatively and bidirectionally connected to the first computing unit of the operations control center;

wherein the first computing unit of the operations control center is configured to calculate in real time on the basis of data received from the at least one ticket client and data received from the at least one network client, at least one optimal route for dispatching the at least one of the plurality of transport vehicles in the line network, and a distribution of passengers corresponding to the at least one optimal route in the line network; and, wherein, the at least one first display of the at least one of the plurality of transport vehicles is updated continuously in real time by data received from the central control and monitoring software of the first computing unit of the operations control center to display passenger information and the route information of the at least one of the plurality of transport vehicles in the line network;

wherein, the one second display disposed at the at least one junction, and/or at the at least one stop of the line network is updated continuously in real time by data received from the first computing unit of the operations control center to display information pertaining to the route of the at least one of the plurality of transport vehicles as defined by the updated nodes, a current position of the at least one of the plurality of transport vehicles along the route, and the arrival time of the at least one transport vehicle at the at least one junction or stop, and wherein the at least one transport vehicle in the line network is equipped with a GPS device to determine a position of the at least one transport vehicle in the line network, the second computing unit of the at least one network client updating a plurality of second displays based on the GPS data.

2. The system as recited in claim 1, wherein the second computing unit of the at least one network client is a computer-based operations control system for an Intermodal Transport Control System, Computer Aided Dispatch/Automatic Vehicle Location or Automatic Vehicle Location System.

3. The system as recited in claim 1, wherein the at least one of the plurality of transport vehicles including the at least one first display comprises a client of the at least one network client, and the at least one of the plurality of transport vehicles includes means for determining a degree of occupancy thereof.

4. The system as recited in claim 3, wherein the at least one first display is controlled by the second computing unit of the at least one network client, based on a calculation of the first computing unit of the operations control center, and at least approaching nodes of the line network are displayed on the at least one first display.

5. The system as recited in claim 1, comprising the plurality of second displays disposed each node of the line network, and/or at stops between each node, the plurality of second displays connected via a communication device to the second computing unit of the at least one network client, the plurality of second displays displaying:

the current position of the at least one transport vehicle in the line network, an arrival time of the at least one transport vehicle at a respective node or stop, a route with regard to a travel section of the at least one transport vehicle from the current stop or the current node in the line network, and a degree of occupancy of the at least one transport vehicle at the respective node or stop in the line network, wherein, each of the current position, the arrival time, route with regard to travel section, and the degree of occupancy are calculated by the first computing unit of the operations control center and displayed in real time.

6. The system as recited in claim 5, wherein the first computing unit of the operations control center is communicatively and bidirectionally connected to a third computing unit of an individual client, which is communicatively and bidirectionally connected to at least one provider for an individual trip, the first computing unit of the operations control center transmits the required individual trip information, a time of the request at a respective stop, and a number of passengers for the individual trip to the third computing unit for the individual client.

7. The system as recited in claim 1, wherein the first computing unit of the operations control center takes into account data on transport volume in the line network from the past with extrapolation into the future in the calculation.

8. A method for optimizing the use of a line network by a plurality of transport vehicles in a line network of local public transport which defines several lines, each with a plurality of nodes, a travel section being defined between successive nodes, and a route configured to be composed as needed from arbitrary individual travel sections, wherein at the nodes at least two lines meet, and each line of the at least two lines has a starting stop and a terminal stop from which at least one line originates or at least one line arrives and each line has at least one intermediate stop and each node is a stop as well, the method comprising the following steps:

assigning data on a structure of the line network, defined by a combination of individual connected travel sections, to a first computing unit with a control and monitoring software installed in an operations control center;

connecting communicatively, the first computing unit continuously and bidirectionally to ticket clients, wherein the ticket clients comprise at least a ticket vending machine, a mobile end device of a passenger with a mobile APP, or an online portal;

connecting communicatively the first computing unit in the operations control center continuously and bidirectionally to a network client for receiving data from and sending data to clients of the network client, wherein the network client comprises at least a plurality of transport vehicles with at least one display, a plurality of stops with a display, or the line network;

collecting data with a second computing unit of the network client from a plurality of clients of the network client;

transmitting ticket data from the ticket clients to the first computing unit in the operations control center, wherein the ticket data is generated by at least the mobile APP installed on a mobile end device, an online portal, a ticket vending machine, a ticket provided by a driver of a transport vehicle, or a ticket provided by the passenger;

transmitting data from the plurality of clients of the network client to the computing unit in the operations control center, wherein the transmitted data is at least data related to the plurality of transport vehicles;

continuously calculating in real time, by means of the first computing unit, on the basis of data from the ticket clients and data from the network client a degree of occupancy of individual transport vehicles of the plurality of transport vehicles and optimal routes for dispatching the plurality of the transport vehicles in the line network;

displaying in real time and in a continuously updated manner by the control and monitoring software of the first computing unit in the operations control center to the passengers, route information for at least one of the plurality of transport vehicles in the line network on the at least one display of the at least one of the plurality of transport vehicles;

displaying in real time and in a continuously updated manner by the control and monitoring software of the first computer in the operations control center on a display at least at each junction, and at one or more stops of a route network, a current position of at least one of the plurality of transport vehicles in the route network, an arrival time at a respective stop, and a route defined by the updated nodes;

displaying in real time and in a continuously updated manner, by the control and monitoring software of the first computing unit in the operations control center, on the at least one display of the at least one of the plurality of transport vehicles, passenger information data obtained from:

ticket vending machines in the at least one of the plurality of transport vehicles, and network clients that determine occupancy levels of the at least one of the plurality of transport vehicles, and mobile terminal devices of passengers;

distributing based on the transmitted data from the network client and the transmitted data from the ticket clients, the passengers corresponding to one or more individual routes; and creating in real time tickets with regard to the route as needed from the arbitrary individual travel sections;

displaying, on the basis of the calculation of the first computing unit of the operations control center, a current line in the form of a list of nodes of the line network which are still to be approached at least on the at least one display of the at least one of the plurality of transport vehicles and on displays provided at the stops; and updating the displays when the node is departed so that the remaining nodes, which are still to be approached are displayed.

9. The method as recited in claim 8, wherein an individual client is connected in a communicative, bidirectional manner to the first computing unit in the operations control center, wherein individual trips required by passengers are calculated with the first computing unit based on the data from the ticket clients and the network client, and the result is provided to the individual client.

10. The method as recited in claim 8, wherein, when a boarding stop and a destination stop are input by means of at least one element of the ticket clients, a route in the line network is calculated directly by means of the first computing unit of the operations control center and at least one of the plurality of transport vehicles of the lines is assigned.

11. The method as recited in claim 10, wherein inputting at least one of the boarding stop and the destination stop is performed via a ticket feature, wherein the ticket feature is a barcode, a ticket number or an RFID, or the ticket feature is generated by an input at a ticket vending machine in one of the plurality of transport vehicles or at the stop, or the ticket feature is generated by an input directly at the mobile end device, and the ticket feature is transmitted to the control and monitoring software of the first computing unit in the operations control center and to the second computing unit of the network client.

12. The method as recited in claim 11, wherein the first computing unit of the operations control center determines which of the entered ticket features are transmitted to a third computing unit of the individual client, so that the first computing unit orders a provider for individual trips to a required stop in the line network.

* * * * *